United States Patent
Scheid et al.

(10) Patent No.: US 6,612,263 B2
(45) Date of Patent: Sep. 2, 2003

(54) ROTATABLE ELEVATED TETHER DEVICE FOR USE WITH RETRACTABLE RESTRAINTS

(75) Inventors: Steven Scheid, 451 Mission Hills Ct., Chanhassen, MN (US) 55317; Darin Wurm, Monticello, MN (US)

(73) Assignee: Steven Scheid, Chanhassen, MN (US)

(*) Notice: Subject to any disclaimer, the term of this patent is extended or adjusted under 35 U.S.C. 154(b) by 0 days.

(21) Appl. No.: 09/974,230

(22) Filed: Oct. 9, 2001

(65) Prior Publication Data

US 2003/0066493 A1 Apr. 10, 2003

(51) Int. Cl.[7] .............................. A01K 1/04; A01K 3/00
(52) U.S. Cl. ........................ 119/787; 119/788; 248/532
(58) Field of Search ................................ 119/787, 759, 119/762, 764, 776, 780, 786, 788, 789, 791, 792, 794, 797, 801, 807, 51.01, 57.8; 47/32.4, 32.5; 43/4.5, 21.2; 248/530, 532

(56) References Cited

U.S. PATENT DOCUMENTS

| | | | |
|---|---|---|---|
| 2,087,176 A | | 7/1937 | Webb |
| 2,311,823 A | * | 2/1943 | Gaskill ...................... 43/21.2 |
| 2,435,081 A | | 1/1948 | Howard |
| 2,525,890 A | | 10/1950 | Gage |
| 2,706,967 A | * | 4/1955 | Iannetti ...................... 119/786 |
| 2,713,327 A | * | 7/1955 | West ........................... 119/790 |
| 2,987,043 A | | 6/1961 | Spindler |
| D245,032 S | | 7/1977 | Hoffmann |
| 4,620,506 A | * | 11/1986 | Stubbs ........................ 119/780 |
| 4,800,843 A | | 1/1989 | Wendling |
| 5,031,577 A | * | 7/1991 | Flugger ...................... 119/780 |
| 5,044,323 A | * | 9/1991 | Papak ......................... 119/786 |
| 5,353,747 A | * | 10/1994 | Fain ............................ 119/780 |
| 5,957,092 A | | 9/1999 | Colsch |
| 6,056,450 A | * | 5/2000 | Walling ...................... 352/243 |
| 6,314,916 B1 | * | 11/2001 | Watson, Sr. ................. 119/769 |
| 6,401,656 B1 | * | 6/2002 | Adkisson ................. 119/51.01 |

OTHER PUBLICATIONS

Product of China, *Pro–tect Your Pet Dome Stake Directions for Use:*,Distributed by Pro–tect Your Pet Valco/Pak–Tite, Inc. P.O. Box 3308, New Orleans, LA 70117; with photo attached.

* cited by examiner

Primary Examiner—Charles T. Jordan
Assistant Examiner—Susan C. Alimenti
(74) Attorney, Agent, or Firm—Altera Law Group LLC

(57) ABSTRACT

A tether device employing an anchor shaft and a rotatable shaft is disclosed. The rotatable shaft has a lower section movably mounted within the anchor shaft. The rotatable shaft further includes an elevated section having a fastening member attached. The elevated section may be exposed above ground at a height sufficient to keep an attached retractable restraint from touching the ground. The fastening member is attached near to the top of the rotating shaft and may be adapted to receive a retractable restraint, particularly an animal restraint. The tether device optionally includes a bearing in contact with the anchor shaft and the rotatable shaft to reduce rotational friction.

10 Claims, 3 Drawing Sheets

ROTATABLE ELEVATED TETHER DEVICE FOR USE WITH RETRACTABLE RESTRAINTS

FIELD OF THE INVENTION

The invention relates generally to tether devices, and more particularly to rotatable tether devices particularly for securing a retractable animal restraint.

BACKGROUND OF THE INVENTION

Restraint devices, especially for animals and toddlers, are well known and widely used. A simple form of restraint is a leash that can be attached to a collar or harness on the animal. A leash usually includes a handle, a lead, and a clip that attaches to the animal. Adaptations of such restraints have also been used to safely secure young children.

More recent innovations in restrains include the development of retractable restraints. These restraints typically include a lead, handle, and clip similar to a leash, but also have a base at the handle which contains a mechanism for compactly containing the lead, such as a spring-loaded reel. These restraints have a number of advantages over leashes.

A retractable restraint allows the lead to be retracted and stored without the lead becoming tangled. The retractable restraint can keep a constant tension on the lead through a range of distances between the animal and the holder of the restraint. A constant tension helps keep the animal from becoming entangled with the lead. Also, better control can be had over the animal when there is constant tension on the lead. An animal that is trained to heel is aided when there is a slight tension on the restraint, as this tension acts as a reminder to stay in formation.

Oftentimes it is desired to keep an animal tethered to a fixed point with a restraint. For example, in a yard with no fence, it may be desired to tether the animal to keep it from running off the property. A simple stake or pole in the ground can serve this purpose. The animal restraint can be tied to the tether allowing some freedom of movement, while still keeping the animal within defined boundaries.

However, many animals will get entangled with a fixed tether. Dogs in particular tend to get wound around poles and are often unable to extricate themselves. It is known in the art that a tether that allows rotation of the restraint will alleviate this entanglement.

Prior art implementations of restraint tethers are typically arranged such that the restraint is attached low to the ground. These implementations are designed with a minimal profile above ground to reduce likelihood of the restraint from getting caught on and winding around the tether. While these implementations may be effective for a leash, they pose problems when used with retractable restraints.

A retractable animal restraint typically includes a base which houses a retraction device. When attached to a low mounted tether, the restraint's base will tend to get dragged over the ground. Dragging the restraint's base can damage its casing and allow dirt and other contaminants to enter the retraction mechanism. A low mounted restraint base is also vulnerable to being chewed on by the animal it is restraining.

There is a need for an improved tether device allowing a retractable restraint to be easily tethered without the restraint touching the ground or being accessible by the animal being restrained. The present invention fulfills this and other needs, and addresses other deficiencies of prior art implementations.

SUMMARY OF THE INVENTION

The present invention is directed to a rotatable tether device for securing a restraint to a fixed point, the restraint including a retractable animal restraint device. According to one embodiment of the present invention, the tether device includes a first anchor shaft having a cavity. The cavity is open at a top of the anchor shaft. A stop member is fixedly disposed within the cavity. A second rotatable shaft having a lower section is movably mountable within the anchor shaft. The rotatable shaft further includes an elevated section exposed above the ground. The tether assembly further includes a bearing in contact with the anchor shaft and the rotatable shaft. The bearing acts to reduce rotational friction between the shafts. A fastening member is connected near to the top of the elevated section of the rotatable shaft.

In one configuration, the stop member further includes a longitudinal crimp in the lower section of the anchor shaft. In another configuration, the rotatable shaft is slidably retractable from the anchor shaft.

There are multiple bearing configurations possible in this embodiment of the current invention. In one configuration, the bearing includes at least one ball bearing sized to be received within the cavity of the fixed shaft. In another configuration, the bearing comprises at least one bushing fixedly mounted to at least one of the anchor shaft and the rotatable shaft. The bearing may be longitudinally restrained in at least a downward direction by the stop member.

Another embodiment of the present invention is a tether device for securing a retractable restraint device to a fixed point. The tether device includes a first anchor shaft having a cavity. The cavity is open at a top of the anchor shaft. A stop member is fixedly disposed within the cavity. A second rotatable shaft having a lower section is movably mountable within the anchor shaft. The rotatable shaft further includes an elevated section exposed above the ground. The elevated section is a distance above ground sufficient to ensure that the retractable restraint device is suspended above ground when attached near the top of the elevated section. A fastening member is connected near to the top of the elevated section of the rotatable shaft. The fastening member is adapted to receive the retractable restraint device.

In one configuration of this embodiment, the stop member further includes a longitudinal constriction in the lower section of the anchor shaft. The longitudinal constriction may be constructed to allow the passage of fluids therethrough. In another configuration, the rotatable shaft is slidably retractable from the anchor shaft.

In one aspect of the current invention, the fastening member includes a loop. The loop includes an openable section pivotably connected to a periphery of the loop. The loop further includes a spring mechanism providing a closing force on the openable section. The fastening member can further include a loop portion having an aperture sized to receive the rotatable shaft. The loop portion and the rotatable shaft are mechanically bonded to prevent relative movement therebetween.

Yet another embodiment of the present invention is a tether device for securing a retractable restraint device to a fixed point. The tether device includes a first anchor shaft having a cavity. The cavity is open at a top of the anchor shaft. A stop member is fixedly disposed within the cavity. A second rotatable shaft having a lower section is movably mountable within the anchor shaft. The rotatable shaft further includes an elevated section exposed above the ground. The elevated section is a distance above ground sufficient to ensure that the retractable restraint device is suspended above ground when attached near the top of the elevated section. A fastening member is connected near to the top of the elevated section of the rotatable shaft. The fastening member is adapted to receive the retractable restraint device. The tether assembly further includes a bearing in contact with the anchor shaft and the rotatable shaft. The bearing acts to reduce rotational friction between the shafts.

In one configuration of this embodiment, the stop member further includes a longitudinal constriction in the lower section of the anchor shaft. The longitudinal constriction may be constructed to allow the passage of fluids therethrough In another configuration, the rotatable shaft is slidably retractable from the anchor shaft.

There are multiple bearing configurations possible in this embodiment of the current invention. In one configuration, the bearing includes at least one ball bearing sized to be received within the cavity of the fixed shaft. In another configuration, the bearing comprises at least one bushing fixedly mounted to at least one of the anchor shaft and the rotatable shaft. The bearing may be longitudinally restrained in at least a downward direction by the stop member.

In one aspect of the current invention, the fastening member includes a loop. The loop includes an openable section pivotably connected to a periphery of the loop. The loop further includes a spring mechanism providing a closing force on the openable section. The fastening member can further include a loop portion having an aperture sized to receive the rotatable shaft. The loop portion and the rotatable shaft are mechanically bonded to prevent relative movement therebetween.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
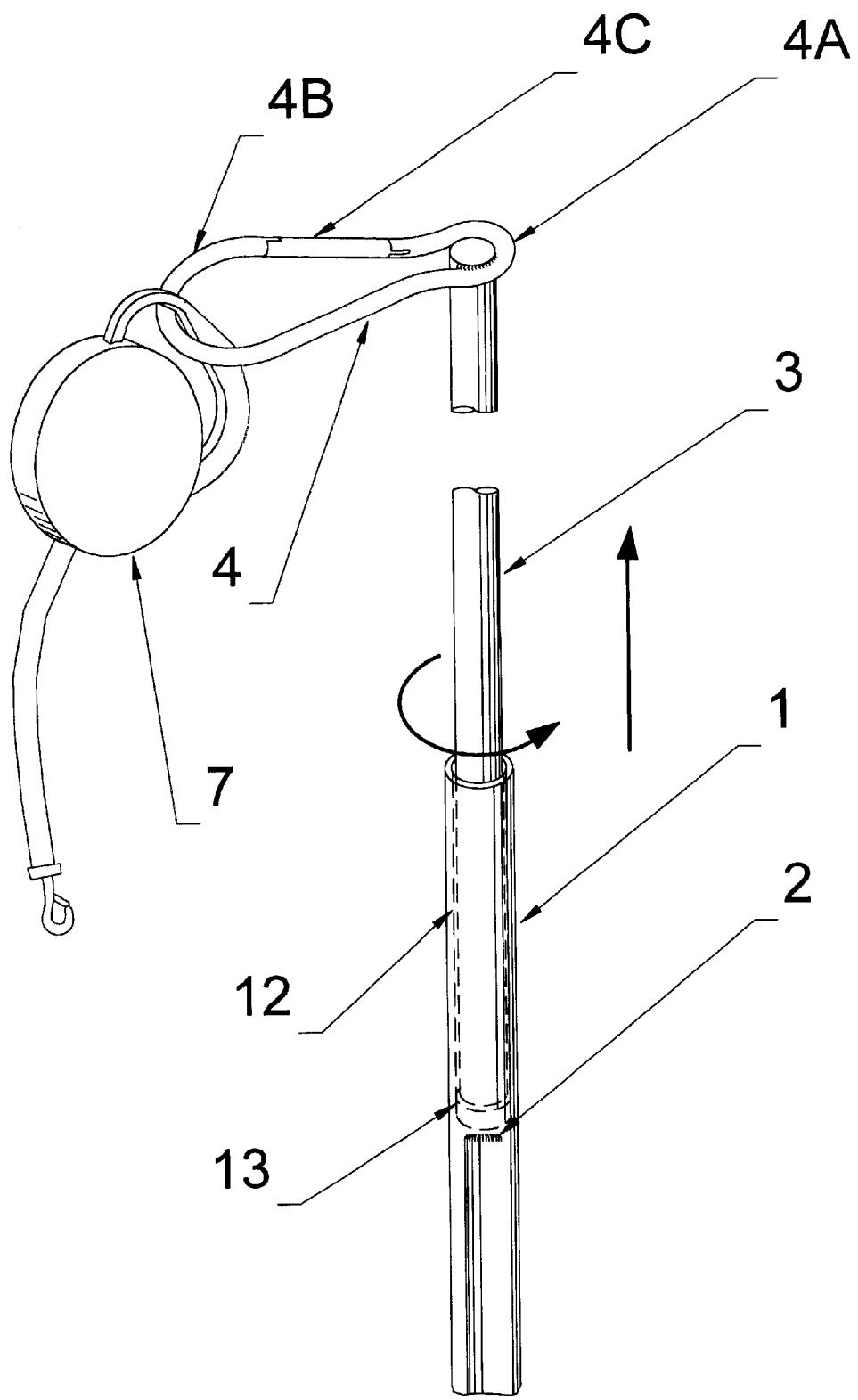
FIG. 1 is a perspective view of an animal tether device embodying features of the present invention.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to the drawings, and in particular to FIG. 1, where a perspective view is of a tether device is shown in accordance with an embodiment of the present invention. The animal tether device includes an anchor shaft 1, a stop member 2, a rotatable shaft 3, and a fastening member 4. The lower section of the anchor shaft 1 may be adapted for insertion into the ground. The anchor shaft 1 includes a cavity 12 that is longitudinally oriented and open at least at the top of the shaft.

The rotatable shaft 3 has a lower section disposed within the longitudinal cavity 12 such that the rotatable shaft 3 is able to axially rotate within the anchor shaft 1 as indicated by the semi-circular arrow in FIG. 1. The bottom end of the rotatable shaft 3 rests on or near the stop member 2, the stop member 2 acting to restrain downward motion of at least the rotatable shaft 3. A bearing 13 is located between the rotatable shaft 3 and the anchor shaft 1 to reduce rotational friction of the rotatable shaft 3. In one arrangement, the bearing 13 may be restrained in at least the downward direction by the stop member 2.

The fastening member 4 connects near to the top of the rotatable shaft 3 such that a tangential force applied to the fastening member 4 causes rotation of the rotatable shaft 3. This allows the animal restraint 7 attached to the fastening member 4 to rotate when an animal attached to the animal restraint 7 circumnavigates the animal tether device. The rotation of the animal restraint 7 advantageously prevents wrapping of the animal restraint 7 around the rotatable shaft 3 due to animal movement.

Figure 2:
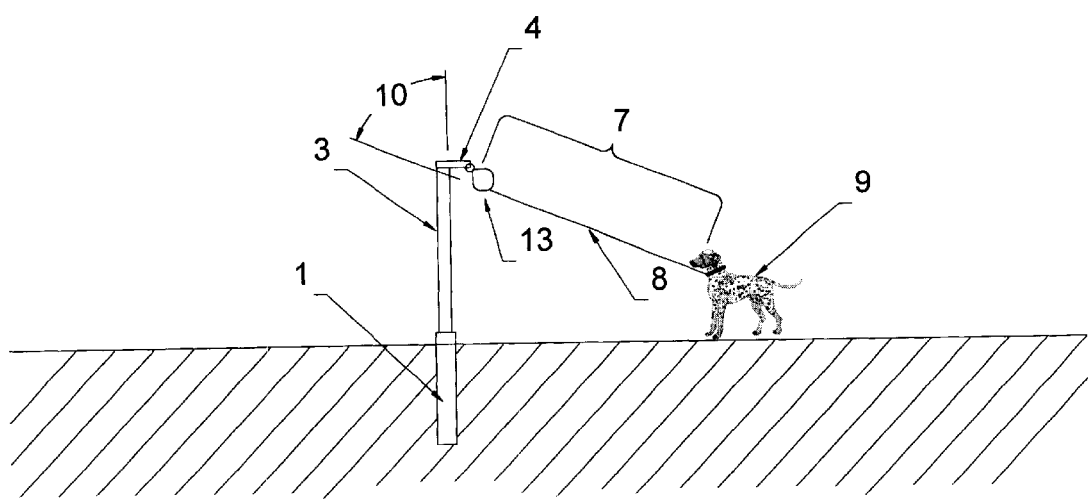
FIG. 2 is an external view of the an embodiment of the invention showing a retractable animal restraint attached to the tether device and an animal attached to the retractable animal restraint.

Turning now to FIG. 2, a tether device according to the present invention is illustrated connected to an animal restraint 7. The rotatable shaft 3 has an elevated section extending vertically above ground by a distance suitable to ensure that at least a base 15 of the attached animal restraint 7 does not touch the ground. The animal restraint 7 connects to the fastening member 4, the fastening member 7 typically attached at or near to the top of the rotatable shaft 3. The fastening member 7 is suitably adapted to receive the animal restraint 7.

The elevation of the animal restraint 7 when it is attached to the fastening member 4 is advantageous, especially when the restraint 7 includes a retractable lead 8. The combination of the lead retraction and the elevation of the animal restraint attach point beneficially helps to keep the retractable lead 8 from becoming entangled around the animal's legs as the animal 9 moves around the tether.

The animal restraint 7 includes a base 15 attached to the fastening member 4. The base 15 has a tensioning mechanism acting on the retractable lead 8 that takes up slack as the animal 9 moves to and from the tether assembly. The elevation of the fastening member 4 on the rotatable shaft 3 is such that it at least keeps the base 15 from touching the ground. Having the base 15 off of the ground is desirable as it helps to keep the base 15 clean and helps prevent the animal 9 from chewing on the base 15.

The retractable animal restraint 7 is typically designed to be held by a person. Such a restraint may work best at an angle formed when a person holds the base 15 and the retractable lead 8 is taut. As shown in FIG. 2, when the retractable lead 8 is tautly connected to the animal 9, it forms an angle 10 with respect to vertical. In an embodiment of the present invention where the rotatable shaft 3 height is roughly equal to an average human midsection height, the angle 10 approximates the intended usage angle of the restraint 7. Such an embodiment would allow a large variety of restraint designs to operate correctly, as the angle 10 approximates the angle formed when the base 15 is held by a person in normal use.

It can be appreciated by one skilled in the art that the present invention has utility when used with a non-retractable restraint, such as a leash. Although the leash does not have a mechanism to take up slack, the elevation of the rotatable shaft 3 forms a lead angle 10 when the leash is substantially taut. The angle 10 approximates a leash angle as held by a person, and can be a more natural arrangement for an animal accustomed to being walked on a leash.

Another aspect of the present invention relating to the rotatable shaft 3 merits discussion. In one configuration of the invention, the rotatable shaft 3 can be longitudinally translated within the anchor shaft 1, as indicated by the vertical arrow in FIG. 1. This translation can allow the rotatable shaft 3 to be fully removed from the anchor shaft 1. Removability of the rotatable shaft 3 provides numerous advantages. For example, in an installation area covered by grass, the anchor shaft 1 can be installed to minimally extend above ground. When the rotatable shaft 3 is removed, the tether area can easily be mowed.

Another advantage to a configuration having a removable rotatable shaft 3 concerns relocatability of the tether. In one embodiment, a plurality of anchor shafts 1 could optionally be provided with the animal tether device. The plurality of anchor shafts 1 could be installed at various locations, allowing the convenient relocation of the tether point by simply moving the rotatable shaft 3 to a differently located anchor shaft 1.

Convenient relocation of the animal tether device provides numerous advantages. For example, the convenient changing of tethering locations can be performed with the goal of minimizing wear on grassy surfaces. Also, allowing a conveniently selectable plurality of tethering areas allows optimizing animal placement based on weather conditions.

Turning again to FIG. 1, more detailed aspects of the present invention are now discussed. The anchor shaft 1 serves to at least restrain the tether device within the ground. In the configuration illustrated in FIG. 1, the anchor shaft 1 is a tubular section, typically made of steel. Elongated shapes with non-circular transverse cross sections can serve as the anchor shaft 1 assuming the movable member 3 is able to rotate within the anchor shaft 1. Other structural members that are not substantially elongated can serve as the anchor shaft 1 as long as the other structural members keep the tether device fixed in the ground when subject to the pulling forces generated by the animal being restrained.

In applications for restraining a domestic dog, a fixed member 1 made of steel tubing with an outer diameter between about 0.75 inches and about 1.50 inches and a length between about 18 inches and about 36 inches can provide sufficient restraint while allowing easy installation by an average consumer. In such an embodiment, a tubular wall thickness of about 0.10 to about 0.15 inches is adequate.

The lower portion of the anchor shaft 1 may be adapted for insertion into the ground. Various ground materials are possible and adaptations of the anchor shaft 1 to those materials are known in the art. For placement into relatively pliable dirt, a configuration as described, with an anchor shaft 1 made from steel tubing, is already substantially adapted for insertion into the ground. Other adaptations of the anchor shaft to improve insertability may include a pointed or narrowed end. In another configuration described below, the stopping member 2 can integrally provide such an adaptation.

The stopping member 2, serves to at least restrict downward movement of the rotatable shaft 3 within the anchor shaft 1. The stopping member 2 can also restrict downward motion of the bearing 13. The embodiment of the present invention shown in FIG. 1 has a stopping member 2 formed by a creating longitudinal constriction or crimp on a lower section of the anchor shaft 1. This crimped stopping member has a number of advantages. A crimp is inexpensive to manufacture and beneficially allows fluid to drain through the bottom of the anchor shaft 1 since it is preferably not a complete barrier to fluids. Further, the crimped profile at the bottom of the anchor shaft 1 allows easier insertion of the anchor shaft 1 in cases where the ground is comprised of dirt.

Other structures that can serve as a stopping member 2 are well known in the art, such as a lateral crimp, an insert, a pin, and an internal snap ring. Another embodiment of the present invention can have the stopping member 2 disposed on the rotatable shaft 3. This arrangement of a stopping member disposed on the rotatable shaft 3 can be realized by numerous structural members known in the art, such as an external snap ring, a welded ring, and a radial pin. In such an embodiment, the stopping member 2 is typically located on the rotatable shaft 3 where it interfaces with the top of the anchor shaft 1.

The rotatable shaft 3 serves at least as a rotatable structure that elevates the fastening member 4. In the embodiment illustrated in FIG. 1, the rotatable shaft 3 can be an elongated cylindrical tube or rod. In other embodiments, a non-circular transverse cross section is possible assuming that the cross section allows rotation of the rotatable shaft 3 within the anchor shaft 1.

The fastening member 4 is shown attached to the top of the rotatable shaft 3 in FIG. 1. In this embodiment, the fastening member 4 is a commercially available chain link accessory, having a pear-shaped perimeter with loops 4A and 4B, and a closure 4C. The closure 4C is an openable section pivotably connected to the periphery of the loop 4A. The fastening member of this configuration also has a spring mechanism which provides a closing force on the closure 4C.

The fastening member 4 includes a loop 4B having an aperture sized to receive a portion of the rotatable shaft 3. The loop 4B can be affixed to the top of the rotatable shaft 3 by welding or some other mechanical bonding method to prevent relative motion therebetween. In a preferred embodiment, the fastening member 4 is attached orthogonally to the rotatable shaft.

Other configurations of the fastening member 4 are known in the art, such as a plate with an attachment hole or a quick disconnect clamp. Non-orthogonal orientations of the fastening member 4 relative to the rotatable shaft 3 may also be desirable in certain circumstances.

It is desirable that the fastening member 4 extend radially some distance from the rotatable shaft 3 to allow easier attachment of the restraining device 7. Further, when the fastening member 4 is radially extended, the fastening member 4 will apply a greater moment about the rotatable shaft 3 in response to a pulling force on the restraining device 7. A greater moment about the rotatable shaft 3 allows the rotatable shaft 3 to rotate easier in response to a pulling force.

Figures 3, 4, 5:
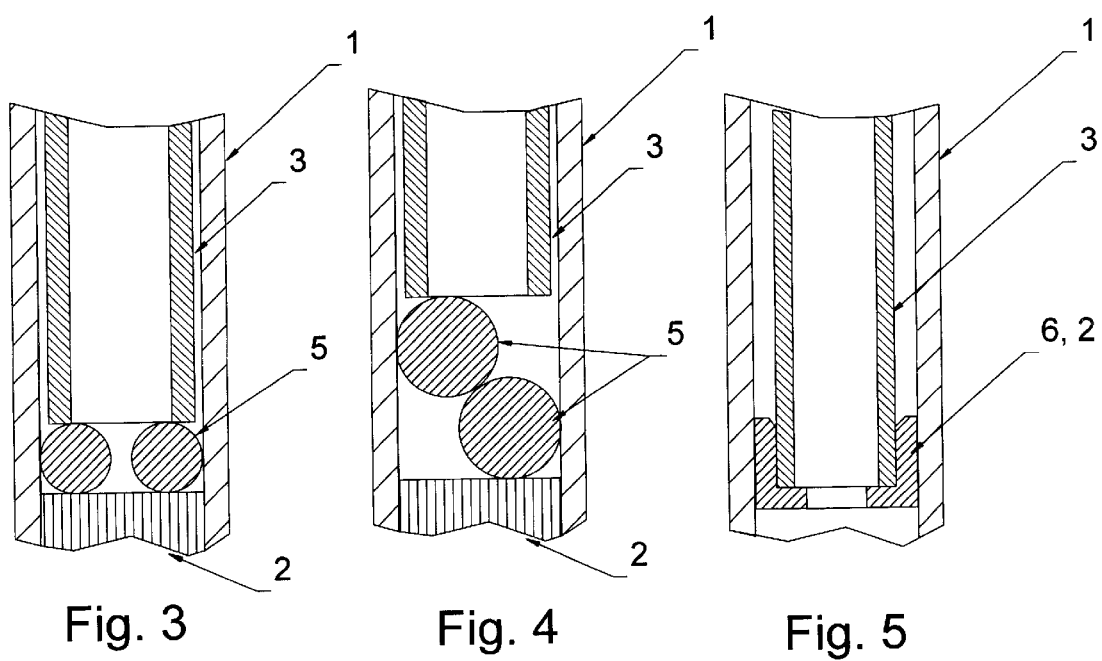
FIG. 3 is a cross sectional view of the interface between the anchor shaft and the rotatable shaft, showing an configuration using ball bearings as the bearing.
FIG. 4 is a cross sectional view of the interface between the anchor shaft and the rotatable shaft, showing an alternate configuration using ball bearings as the bearing.
FIG. 5 is a cross sectional view of the interface between the anchor shaft and the rotatable shaft, showing an embodiment using a bushing as the bearing.

Turning now to FIG. 3, where a longitudinal cross sectional view at the anchor shaft 1 is shown. In this configuration, a bearing 13 consisting of two spherical balls 5, typically made of steel, sits freely against the stopping member 2. The bottom end of the rotatable shaft 3 sits atop the balls 5. In another configuration, a single ball of appropriate diameter can be used. In yet another configuration, more than two balls of appropriate diameter could be used. In applications where large forces or improved wear life is desired, a ball bearing assembly with bearing races can be utilized.

FIG. 4 illustrates an alternate configuration of the bearing 13 using ball bearings 5. In this configuration, the diameter of the balls 5 is substantially greater than one half the inner diameter of the anchor shaft 1. This results in the balls 5 being stacked one upon the other when installed.

FIG. 5 illustrates an alternate configuration of the bearing 13. In this configuration, a bushing 6 is used. The bushing 6 has a narrowed end, such that it also serves as the stop member 2. The bushing can be fixably mounted inside the anchor shaft with an interference fit, for example. Other embodiments of the bearing 13 that reduce rotational friction between the anchor shaft 1 and the rotatable shaft 3 are possible as well and are well known in the art.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A tether device for securing a restraint to a fixed point, the restraint having a base section, the tether device comprising:
   an anchor shaft comprising a cavity, the cavity open at a top of the anchor shaft;
   a rotatable shaft comprising a lower section rotatably mountable within the anchor shaft and slidably removable therefrom, the rotatable shaft further comprising an elevated section exposed above the ground so that a top of the elevated section is located a predetermined distance above the ground;
   a stop member comprising a longitudinal constriction in a lower portion of the anchor shaft for limiting the degree of insertion of the rotatable shaft within the anchor shaft;
   a bearing in contact with the anchor shaft and the rotatable shaft, the bearing reducing rotational friction between the shafts;
   a fastening member rigidly connected near to the top of the elevated section of the rotatable shaft; and
   wherein the restraint is attachable to the fastening member so that at least the base section of the restraint is suspended above the ground.

2. The tether device of claim 1, wherein the longitudinal constriction allows the passage of fluids therethrough.

3. The tether device of claim 1, wherein the bearing comprises two ball bearings, each ball bearing having a outer diameter less than an inner diameter of the anchor shaft and greater than half the inner diameter of the anchor shaft, one of the bearings in rolling contact with the stop member.

4. The tether device of claim 1, wherein the bearing is longitudinally restrained in at least a downward direction by the stop member.

5. The tether device of claim 1, wherein the stop member further comprises a longitudinal constriction in the lower portion of the anchor shaft.

6. The tether device of claim 1, wherein the longitudinal constriction allows the passage of fluids therethrough.

7. A tether device for securing a retractable restraint device to a fixed point, comprising:
   a first anchor shaft comprising:
      a cavity, the cavity open at a top of the anchor shaft; and
      a stop member;
   a second rotatable shaft comprising a lower section rotatably mountable within the anchor shaft and slidably removable therefrom, the rotatable shaft further comprising an elevated section exposed above the ground, a top of the elevated section a distance above ground sufficient to ensure that the retractable restraint device is suspended above ground when attached near the top of the elevated section;
   a first and second ball bearing, each ball bearing having an outer diameter less than an inner diameter of the anchor shaft but greater than half the inner diameter of the anchor shaft, the first ball bearing in rolling contact with the stop member and the second ball bearing in rolling contact with the rotatable shaft; and
   a fastening member fixably connected near to the top of the elevated section of the rotatable shaft, the fastening member adapted to receive the retractable restraint device, the fastening member comprising a loop, the loop comprising an openable section pivotably connected to a periphery of the loop, the loop further comprising a spring mechanism providing a closing force on the openable section.

8. The tether device of claim 7, wherein the stop member further comprises a longitudinal constriction in the lower section of the anchor shaft.

9. The tether device of claim 8, wherein the longitudinal constriction allows the passage of fluids therethrough.

10. The tether device of claim 7, wherein the fastening member further comprises a second loop portion having an aperture sized to receive the rotatable shaft, and wherein the second loop portion and the rotatable shaft are mechanically bonded to prevent relative movement therebetween.

* * * * *